(No Model.) 4 Sheets—Sheet 1.

J. F. GENT.
MACHINE FOR EXTRACTING GERMS FROM GROUND CEREALS.

No. 533,217. Patented Jan. 29, 1895.

(No Model.) 4 Sheets—Sheet 2.

J. F. GENT.
MACHINE FOR EXTRACTING GERMS FROM GROUND CEREALS.

No. 533,217. Patented Jan. 29, 1895.

(No Model.) 4 Sheets—Sheet 3.

J. F. GENT.
MACHINE FOR EXTRACTING GERMS FROM GROUND CEREALS.

No. 533,217. Patented Jan. 29, 1895.

Witnesses
G. A. Vauberschmidt
J. D. Kingsbery

Inventor
Joseph F. Gent
By Whitaker & Prevost, Attorneys (No Model.) 4 Sheets—Sheet 4.
J. F. GENT.
MACHINE FOR EXTRACTING GERMS FROM GROUND CEREALS.
No. 533,217. Patented Jan. 29, 1895.
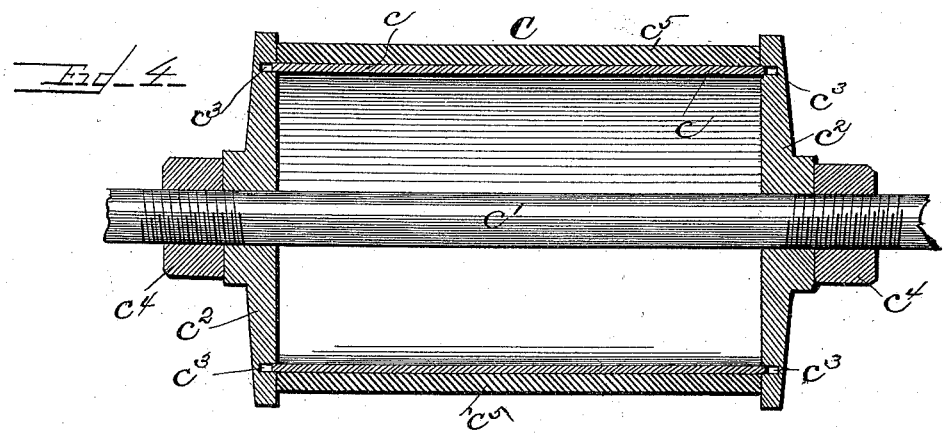
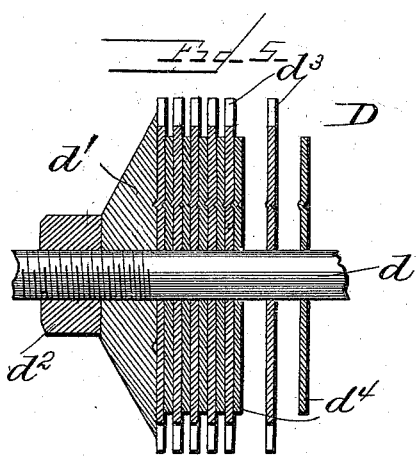
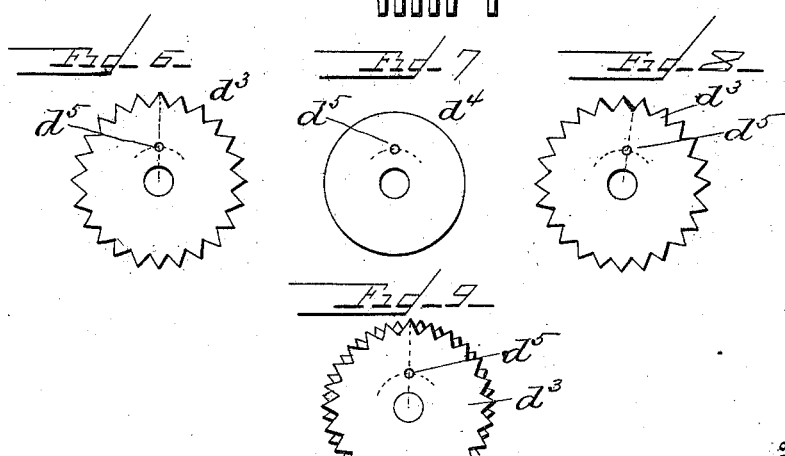
Witnesses
Inventor
Joseph F. Gent
Attorneys

UNITED STATES PATENT OFFICE.

JOSEPH F. GENT, OF COLUMBUS, INDIANA.

MACHINE FOR EXTRACTING GERMS FROM GROUND CEREALS.

SPECIFICATION forming part of Letters Patent No. 533,217, dated January 29, 1895.

Application filed September 18, 1894. Serial No. 523,338. (No model.)

*To all whom it may concern:*

Be it known that I, JOSEPH F. GENT, a citizen of the United States, residing at Columbus, in the county of Bartholomew and State of Indiana, have invented certain new and useful Improvements in Machines for Extracting Germs from Ground Cereals; and I do hereby declare the following to be a full, clear, and exact description of the invention, such as will enable others skilled in the art to which it appertains to make and use the same.

My invention is an improvement in germ extractors for ground or crushed cereals and it consists in the novel features of construction and combination of parts hereinafter fully described.

In the accompanying drawings I have shown one form in which I have contemplated embodying my invention and said invention is fully disclosed in the following description and claims.

Referring to the said drawings: Figure 1, is a front view of a machine embodying my invention. Fig. 2, is a side elevation of the same. Fig. 3, represents a vertical transverse section through the machine. Fig. 4, is a detail sectional view of one of the elastic feeding rollers. Fig. 5, is a detail sectional view of a portion of one of the picker cylinders. Figs. 6, 7, 8 and 9 are details illustrating the manner of constructing said picker cylinders. Fig. 10, is a detail view of the adjusting devices for one end of one of the feeding rollers.

In the drawings A represents a bed upon which the rectangular vertically disposed frame A' of the machine rests, the said frame being constructed so as to support the various working parts of the machine. On the upper part of the main frame is a hopper B provided at the bottom with a corrugated or slightly roughened feed roll $b$ extending the entire length of the roller and having its shaft supported in suitable bearings and provided with a driving pulley or wheel to which power is applied in any desired manner. The lower portion of the rear wall of the hopper B is cut away and said rear wall is provided with a pivoted or hinged plate $b'$ which is engaged by a spring $b^2$ secured to the wall of the hopper and provided with an adjusting nut $b^3$ to vary the pressure of the spring. The valve or hinged plate $b'$ bears against the feeding roller $b$ and according to the pressure of the spring $b^2$ allows a greater or less amount of material to pass between it and the feed roll. The material passing the valve or plate $b'$ drops from the feed roll through a vertical passage $b^4$ into a smaller hopper B' provided with an inclined bottom and a hinged front wall $b^5$ the position of which is positively regulated by means of an adjusting rod $b^6$ and nut $b^7$.

Beneath the hopper B' is a roller C which I term an elastic feeding roller. This roller is preferably formed as shown in Fig. 4 and consists of a shell or cylinder $c$ of iron or steel connected to the shaft $c'$ by means of heads $c^2 c^2$. The heads $c^2 c^2$ are of greater diameters than the shell $c$ and are provided with annular grooves $c^3$ into which the shell or cylinder ends fit snugly and the shaft $c'$ is provided with screw threaded portions engaged by nuts $c^4 c^4$ which can be tightened to draw the heads onto the ends of the cylinder $c$. The shell or cylinder $c$ is provided with a coating $c^5$ of considerable thickness formed of the composition of gelatine and glycerine from which printers' inking rolls are made, thus giving the rollers a tough elastic coating or surface. When the roll is first coated the elastic material $c^5$ extends to the ends of the shell $c$, and the heads are drawn up tight enough to give them a firm bearing on the shell and the outer portions of said heads will slightly compress the gelatinous coating. After the roll has been in use a considerable time should the coating have lost any of its elasticity, the heads will be forced inward farther to further compress the elastic coating longitudinally of the roll and thus increase its elasticity.

Above and forward of the elastic feeding roller C is located a picker roll D for removing the germs from the ground cereals. These picker rolls are preferably constructed as illustrated in Figs. 5 to 9 inclusive, in which $d$ represents the shaft of the roll provided with heads $d' d'$ and nuts $d^2 d^2$ engaging screw threaded portions of said shaft to move said heads inwardly. The body of the roll is formed of a series of picker saws $d^3 d^3$ and spacing plates $d^4 d^4$ both provided with central apertures for engaging the shaft $d$. The saws $d^3$ $d^3$ are to be placed upon the shaft so that the teeth of each will be in line with the spaces between the teeth of its next adjacent saws and to insure the proper adjustment of the saws I provide each saw and ring with a counter punch or depression at the same distance from its center producing a projection on the other side of the saw so that when they are placed upon the shaft the said counter punches must engage each other and thus determine the positions of the saws.

In Fig. 6 I have shown one of the saws $d^3$ provided with a counter punch or depression $d^5$ in line with the center of one of the teeth and at a given distance from the center of the saw.

Fig. 8 represents one of the saws $d^3$ provided with a counter punch $d^5$ in line with the space between two adjacent teeth and at the same given distance from the center as the other saw.

Fig. 7 represents one of the rings $d^4$, all of said rings being provided with counter punches $d^5$ at the same given distance from the center.

It will be understood that half of the saws required will be counter punched in line with a tooth and the remaining saws will be counter punched in line with a space between two teeth. The saws will then be arranged on the shaft alternately, with a spacing plate between each two saws so that the teeth of one saw must be held in line with the spaces between the teeth of the next adjacent saws, as indicated in Fig. 9. By means of the counter punches the saws and spacing plates can be quickly and easily arranged upon the shaft. The heads $d'$ $d'$ will then be placed upon the shaft and drawn up tightly thus clamping the parts together and forming a rigid cylinder or roll. One of the heads is provided with an annular groove as indicated in Fig. 5 to accommodate the projecting counter punch of the end saw.

Figure 1:
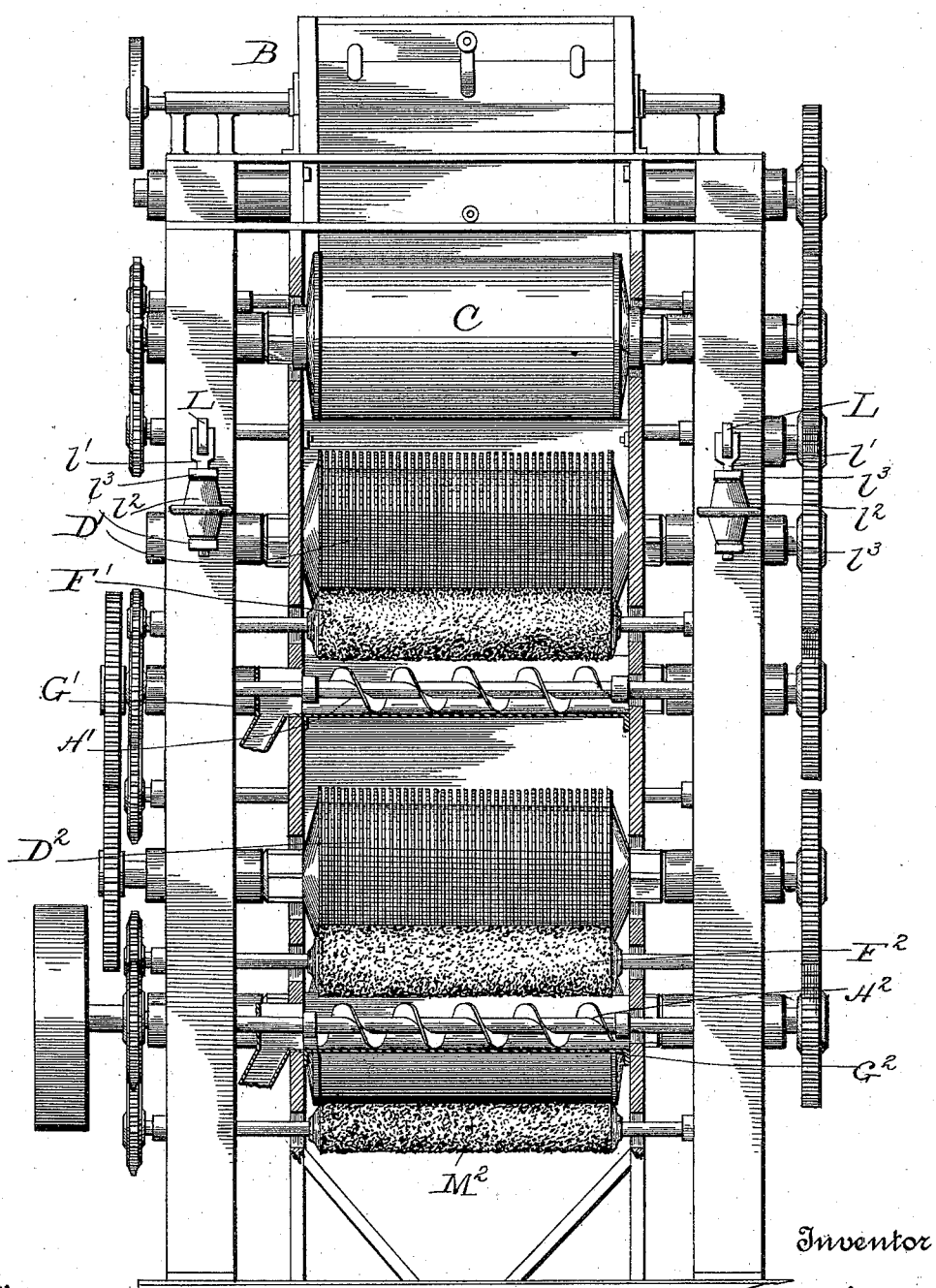
Figure 2:
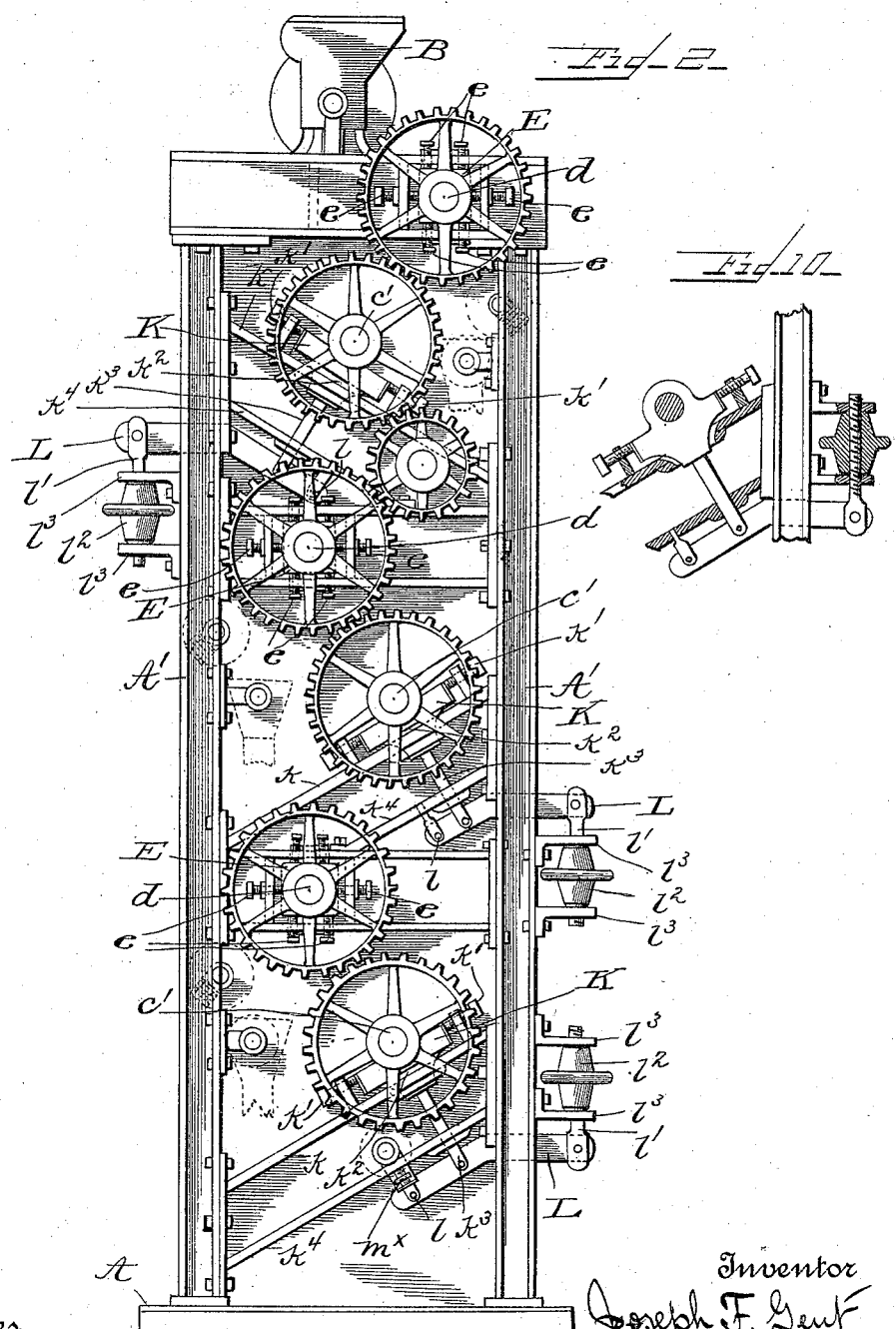

The shaft $d$ of the picker roll D is mounted in rectangular bearing blocks E held in position in the main frame A' by set screws $e$ $e$ which engage the block on all four sides as shown in Fig. 2 thus enabling the picker roll to be accurately adjusted in any direction.

Figure 3:
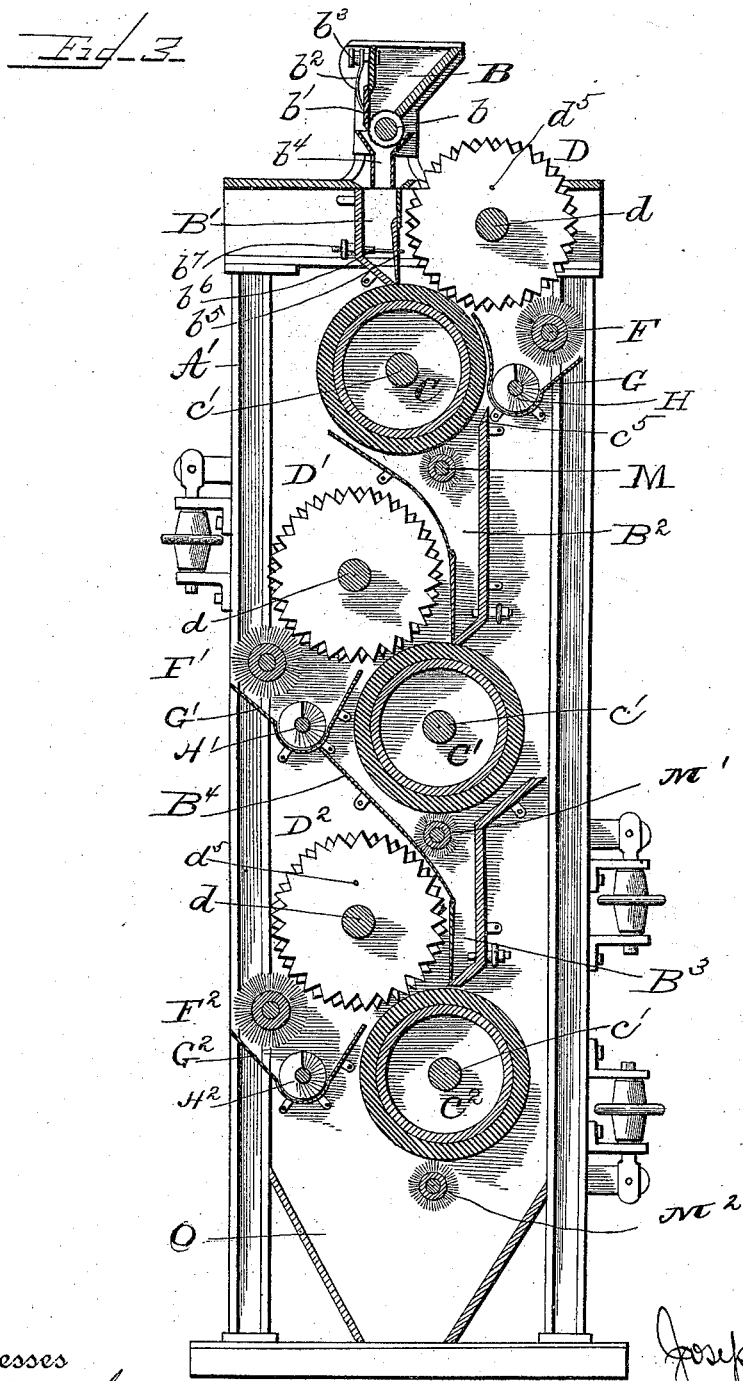

Below the picker roll D is a rotary brush F mounted in suitable bearings for brushing the germs from the teeth of the picker roll. Below the brush F is a trough G in the bottom of which is located a screw conveyer H which receives the germs from the brush F and carries them off to one side of the machine where they may be deposited in a suitable hopper or other receptacle and conducted away in any desired manner. The rear side of the trough G is extended upwardly and rearwardly adjacent to the feeding roller C to a point beneath the picker roll so as to prevent the germs from falling from the picker roll upon the feeding roller as shown in Fig. 3. The elastic feeding roller is also adjustable toward and from the picker roll or cylinder through the following instrumentalities, shown best in Fig. 2.

The shaft $c'$ of the feeding roller C is mounted in bearing blocks K which are supported by inclined brace bars $k$ $k$ forming parts of the main frame of the machine. At each side of the bearings, said brace bars are provided with lugs through which pass set screws $k'$ $k'$ which bear against guide plates which in turn engage the sides of the blocks K and these set screws serve to adjust the blocks laterally. Each of said blocks K is provided with a guiding lug $k^2$ which extends through a guiding recess in the brace bar $k$ and has an extension or rod $k^3$ secured thereto which passes through a guiding aperture or recess in a brace bar $k^4$ of the main frame and is pivoted to the adjusting lever L. This lever L is pivoted at $l$ to a part of the frame and extends outwardly to a point outside of the machine frame where it is pivotally connected to an adjusting screw bolt $l'$ having a screw threaded portion engaging a revolving nut $l^2$ supported between two horizontal brackets $l^3$ $l^3$ which have apertures therein to permit the passage of the bolt or screw $l'$. The nut $l^2$ is preferably provided with a hand wheel as shown so that it can be readily turned to adjust the end of the shaft $c'$ of roller C toward or from the picker roll so as to give the picker just the desired pressure upon the feeding roll.

Below the feeding roller C is a brush M which brushes the material from the surface of the feeding roll after passing the picker roll whereupon it falls into a chute or hopper B² constructed exactly like the small hopper B' before described and provided with an adjustable valve or gate. This hopper or chute delivers the material upon a second feeding roller C' constructed and supported exactly like the roller C, and said material is operated upon by a second picker cylinder D' constructed and supported like the picker cylinder D. The picker cylinder is also provided with a rotary brush F', germ receiving trough G' and screw H', and the feeding roller C' is provided with a cleaning brush M' which removes the material from the surface of the said roller C'. The material then falls into a chute or trough B³ provided also with an adjustable valve, which delivers it to a third feeding roller C², upon which it is subjected to the action of a picker cylinder D³ from which the germs are brushed off by a rotary brush F² into a trough G² and conveyed away by a worm H². The material remaining on the feeding roller is brushed off by a brush M² and falls into a chute or hopper O, from which it passes out of the machine. The chute or trough B³ is provided with a guard or extension B⁴ passing up under the feeding roller C' and brush M' to prevent material falling therefrom onto the picker cylinder D².

It will be seen that the ground or crushed material in passing through the machine is subjected successively to the action of three sets of germ extracting devices, the germs being carried off separately and the material passing from one set of devices to another thus insuring the removal of all the germs.

The cereal is first preferably steamed sufficiently to soften and toughen the husks and germs without affecting the interior starchy portion of the kernel. It is then coarsely ground and the husks and fine meal are removed in any desired or usual manner. The remaining material consisting of hard granules of the starchy portion and the softer germs are then preferably sized by suitable sieves or screens and each size is then subjected to the action of one of my improved machines before described. The material is spread upon the elastic surfaces of the feeding rollers in a thin sheet or layer. The points of the picker saws will press the hard portions of the grain into the surface of the feeding roller but will pierce the germs which are softer or cause them to adhere to said points thereby removing them and permitting the material to adhere to the feeding rollers from which it is removed by the brushes M, M', M².

All of the feeding rollers and picker cylinders are provided with the adjusting devices described with reference to the roller C and cylinder D and the parts can be accurately and quickly adjusted to give the desired results. I also prefer to provide suitable adjusting mechanism for adjusting the brushes M, M', M² with respect to their respective rollers C, C' and C² as indicated at $m^x$ in connection with brush M², see Fig. 2, any preferred adjusting means being employed.

What I claim, and desire to secure by Letters Patent, is—

1. In a germ extractor, the picker cylinder comprising among its members a series of saws, each having a counter punch in line with one of its teeth and a second series of saws alternating with the saws of the first series and provided each with a counter punch in line with a space between adjacent teeth, substantially as described.

2. In a germ extractor the picker cylinder comprising among its members the supporting shaft the heads adjustable thereon, one of said heads being provided with a recess or depression, a series of saws each having a counter punch in line with one of its teeth, a second series of saws each having a counter punch in line with a space between adjacent teeth, and a series of spacing plates provided with counter punches all of said counter punches being located at the same distance from the axis of the picker cylinder, substantially as described.

3. In a germ extractor, the combination with the picker cylinder, of the feeding roller comprising among its members a supporting shaft, a shell, a coating of elastic material, a pair of heads having annular recesses for engaging said shell and portions for engaging said elastic coating, and screw threaded adjusting devices for forcing said heads upon said shell and compressing said elastic coating longitudinally of the roller to increase its elasticity, substantially as described.

4. In a germ extractor, the combination with a picker roll, a feed roll and bearing blocks therefor, slotted supports for engaging and guiding the bearings of said feed roll, adjusting devices secured to said support for positively adjusting said blocks laterally, and holding them rigidly in position pivoted adjusting levers secured to said blocks for adjusting said blocks vertically and screw threaded devices for operating said adjusting levers, substantially as described.

In testimony whereof I affix my signature in presence of two witnesses.

JOSEPH F. GENT.

Witnesses:
L. P. WHITAKER,
J. D. KINGSBERY.